(12) United States Patent
Kwon et al.

(10) Patent No.: US 8,590,925 B2
(45) Date of Patent: Nov. 26, 2013

(54) SIDE AIRBAG FOR VEHICLES

(75) Inventors: Hyock In Kwon, Seongnam-si (KR); Hyeong Ho Choi, Gwangmyeong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 91 days.

(21) Appl. No.: 13/292,499

(22) Filed: Nov. 9, 2011

(65) Prior Publication Data

US 2012/0248745 A1 Oct. 4, 2012

(30) Foreign Application Priority Data

Mar. 29, 2011 (KR) .................. 10-2011-0028015

(51) Int. Cl.
- *B60R 21/207* (2006.01)
- *B60R 21/2338* (2011.01)
- *B60R 21/233* (2006.01)

(52) U.S. Cl.
USPC .............. 280/730.2; 280/743.2; 280/728.2; 280/729

(58) Field of Classification Search
USPC ........ 280/730.2, 743.2, 728.2, 729, 751, 753; 297/216.1, 216.13
See application file for complete search history.

(56) References Cited

U.S. PATENT DOCUMENTS

| | | | | |
|---|---|---|---|---|
| 5,636,862 A | * | 6/1997 | Cheung et al. | 280/730.2 |
| 5,816,610 A | * | 10/1998 | Higashiura et al. | 280/728.3 |
| 5,860,673 A | * | 1/1999 | Hasegawa et al. | 280/730.2 |
| 6,386,577 B1 | * | 5/2002 | Kan et al. | 280/730.2 |
| 7,240,915 B2 | * | 7/2007 | Peng et al. | 280/730.2 |
| 7,695,004 B2 | * | 4/2010 | Inoue | 280/730.2 |
| 7,819,423 B2 | * | 10/2010 | Loibl et al. | 280/730.2 |
| 7,963,553 B2 | * | 6/2011 | Huynh et al. | 280/730.2 |
| 7,971,900 B2 | * | 7/2011 | Lim et al. | 280/730.2 |
| 7,992,894 B2 | * | 8/2011 | Lim et al. | 280/730.2 |
| 8,123,246 B2 | * | 2/2012 | Gilbert et al. | 280/728.2 |
| 8,328,231 B2 | * | 12/2012 | Nakamura et al. | 280/730.2 |
| 2002/0060447 A1 | * | 5/2002 | Acker et al. | 280/730.1 |
| 2006/0163850 A1 | * | 7/2006 | Inazu et al. | 280/730.2 |
| 2006/0175812 A1 | * | 8/2006 | Abramczyk et al. | 280/730.2 |
| 2007/0085308 A1 | * | 4/2007 | Tracht et al. | 280/730.2 |
| 2007/0145727 A1 | * | 6/2007 | Inoue et al. | 280/730.2 |
| 2009/0200775 A1 | * | 8/2009 | Sugimoto et al. | 280/730.2 |
| 2012/0049498 A1 | * | 3/2012 | Wiik et al. | 280/743.2 |

FOREIGN PATENT DOCUMENTS

KR 1020090027979 (A) 3/2009

* cited by examiner

*Primary Examiner* — Paul N Dickson
*Assistant Examiner* — George Spisich
(74) *Attorney, Agent, or Firm* — Morgan, Lewis & Bockius LLP

(57) ABSTRACT

A side airbag for a vehicle may include an inflator provided on a seat side frame in a seat of the vehicle, a first cushion part installed in a seat side pad mounted on the seat side frame, wherein the first cushion part covers the seat side frame and may be fluid-connected to the inflator so that when the inflator may be operated, the first cushion part inflates inside the seat side pad to push an occupant sideways, and a second cushion part integrally connected to the first cushion part so that when gas may be supplied from the inflator into the second cushion part via the first cushion part, the second cushion part protrudes out of the seat side pad to protect a side portion of a body of the occupant.

11 Claims, 3 Drawing Sheets

SIDE AIRBAG FOR VEHICLES

CROSS-REFERENCE TO RELATED APPLICATIONS

The present application claims priority to Korean Patent Application No. 10-2011-0028015 filed on Mar. 29, 2011, the entire contents of which is incorporated herein for purposes by this reference.

BACKGROUND OF THE INVENTION

1. Field of the Invention

The present invention relates to a side airbag which is installed in a seat side pad of a vehicle to protect the side portion of an occupant during a side collision of the vehicle.

2. Description of Related Art

Generally, a variety of airbags are installed in vehicles. Side airbags are embedded in side pads of seats of vehicles so that they are not exposed outside under normal conditions, and when the vehicles are involved in side collisions, the side airbags are deployed out of the seat side pads to protect the side portions of the bodies of occupants.

Many techniques pertaining to side airbags have been developed. However, with the layout of a vehicle seat and the overall vehicle body, it is inevitable that there will be a deficiency in the distance between an occupant and the closest door of the vehicle with regard to a side collision. Therefore, even though the airbag is correctly deployed, the occupant, particularly, his/her side portion, may be injured by the inflation of the airbag cushion.

Furthermore, because the airbag must burst out through a seat cover before being deployed, an inflator has a comparatively large capacity, further increasing a probability of the occupant being injured by a comparatively large inflation force of the cushion.

Taking these aspects into account, it is necessary to secure a predetermined distance between the airbag cushion and the door just before the airbag cushion is deployed. In an effort to achieve this purpose, a technique was proposed, which has two airbag cushions configured in such a way that an inner cushion pushes the occupant away from the door before an outer cushion is deployed forwards to protect the occupant. However, this technique requires two airbag modules and not only makes the design of the seat difficult but also reduces the durability of the seat because the two airbag modules take up much space in the seat pad.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a side airbag for a vehicle which has only a single airbag module making it possible to push an occupant away from a vehicle door before an airbag cushion is deployed.

In an aspect of, the side airbag for a vehicle may include an inflator provided on a seat side frame in a seat of the vehicle, a first cushion part installed in a seat side pad mounted on the seat side frame, wherein the first cushion part covers the seat side frame and may be fluid-connected to the inflator so that when the inflator may be operated, the first cushion part inflates inside the seat side pad to push an occupant sideways, and a second cushion part integrally connected to the first cushion part so that when gas may be supplied from the inflator into the second cushion part via the first cushion part, the second cushion part protrudes out of the seat side pad to protect a side portion of a body of the occupant.

The side airbag may further include a tether having a first end connected to the first cushion part and a second end connected to the seat side frame to support the first cushion part so that the first cushion part maintains covering state of the seat side frame while the first cushion part inflates.

The inflator may be mounted to an outer side surface of the seat side frame, the first cushion part may be connected to the inflator to cover the seat side frame along the outer side surface of the seat side frame, and the tether connects an end of the first cushion part to the seat side frame along an inner side surface of the seat side frame.

A tear line may be formed in the seat side pad and the second cushion part tears the tear line and protrudes out of the seat side pad through the tear line before being deployed forwards to protect the side portion of the occupant.

The first cushion part has a height corresponding to a range from a waist to a chest of the occupant.

The second cushion part may be connected to a medial portion of the first cushion part that covers the seat side frame.

The second cushion part may be connected to the first cushion part at a predetermined point displaced outwards from a medial portion of the first cushion part that covers the seat side frame.

In another aspect of, a side airbag for a vehicle may include a seat side frame provided in a seat side pad in a seat of the vehicle, an inflator provided on the seat side frame, a first cushion part installed in the seat side pad to cover the seat side frame, wherein the first cushion part may be connected to the inflator, so that when the inflator may be operated, the first cushion part inflates inside the seat side pad to push an occupant sideways, and a second cushion part integrally formed and fluid-connected to the first cushion part so that when gas may be supplied from the inflator into the second cushion part via the first cushion part, the second cushion part inflates out of the seat side pad to protect a side portion of a body of the occupant.

The seat side frame includes front and rear bent parts formed by bending both ends of the seat side frame toward an inside of the seat, wherein the first cushion part covers and surrounds the front bent part of the seat side frame.

The side airbag may further include a tether having a first end connected to the first cushion part and a second end connected to the seat side frame to support the first cushion part such that the first cushion part maintains covering state of the seat side frame while the first cushion part inflates wherein the inflator may be mounted to an outer side surface of the seat side frame, the first cushion part may be connected to the inflator along the outer side surface to cover the front bent part of the seat side frame, and the tether connects an end of the first cushion part to the rear bent part of the seat side frame to cover the front bent part of the seat side frame.

A tear line may be formed in the seat side pad and the second cushion part tears the tear line and protrudes out of the seat side pad through the tear line before being deployed forwards to protect the side portion of the occupant.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
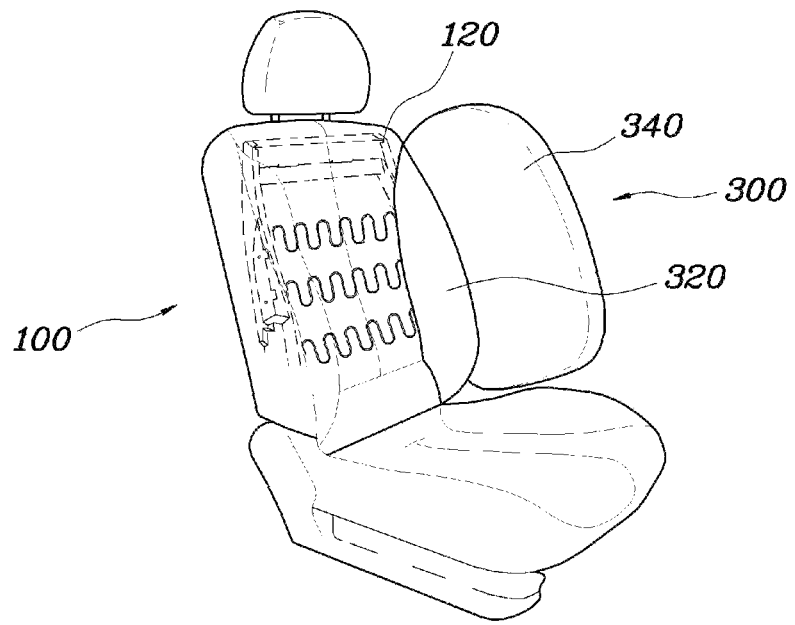
FIG. 1 is a perspective view illustrating deployment of a side airbag for a vehicle, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a side airbag for a vehicle according to a preferred embodiment of the present invention will be described with reference to the attached drawings.

FIG. 1 is a perspective view illustrating deployment of the side airbag, according to the exemplary embodiment of the present invention. As shown in FIG. 1, the side airbag for a vehicle is installed in a side pad of a seat of the vehicle. When an inflator burst open, a first cushion part 320 inflates to push the waist of an occupant sideways, and a second cushion part 340 consecutively inflates to protect the side portion of the occupant.

The first cushion part 320 has a height corresponding to a range from the waist to the chest of the occupant P. In addition, the first cushion part 320 has a comparatively small volume and is able to inflate inside the seat side pad (of course, portion of the first cushion part 320 may protrude out of the seat side pad). The inflation of the first cushion part 320 widens a distance between the occupant and a corresponding door of the vehicle in such a way that the first cushion 320 pushes the waist and the chest of the occupant away from the door. Furthermore, the first cushion part 320 is configured so that the height thereof is not excessive to prevent the first cushion part 320 from impeding deployment of the second cushion part 340. In particular, because the first cushion part 320 has a comparatively small size and only functions to push the occupant, the occupant can be prevented from being injured by the first cushion part 320.

Figure 2:
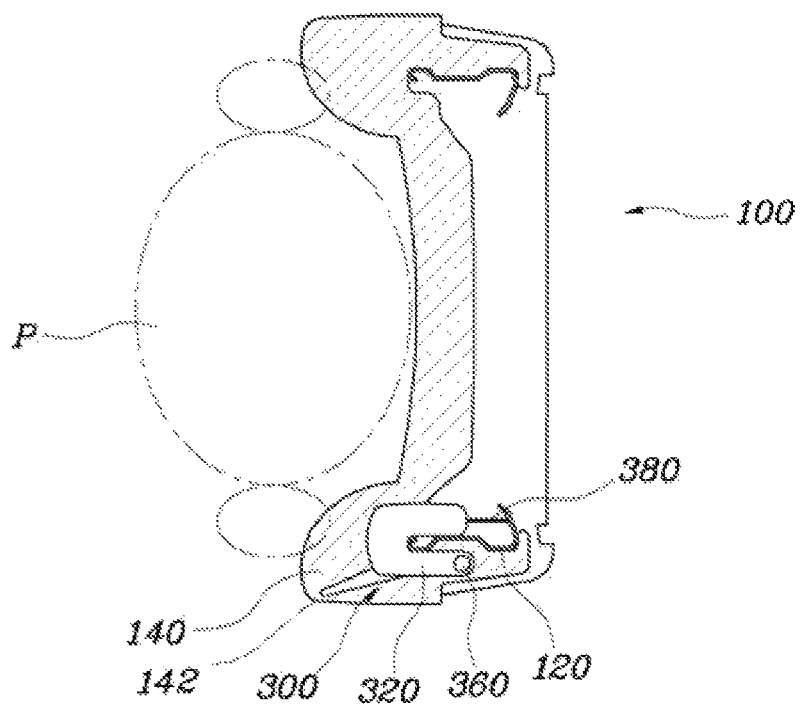
FIG. 2 is a view illustrating the installation of the side airbag of FIG. 1 in a seat.
Figure 3:
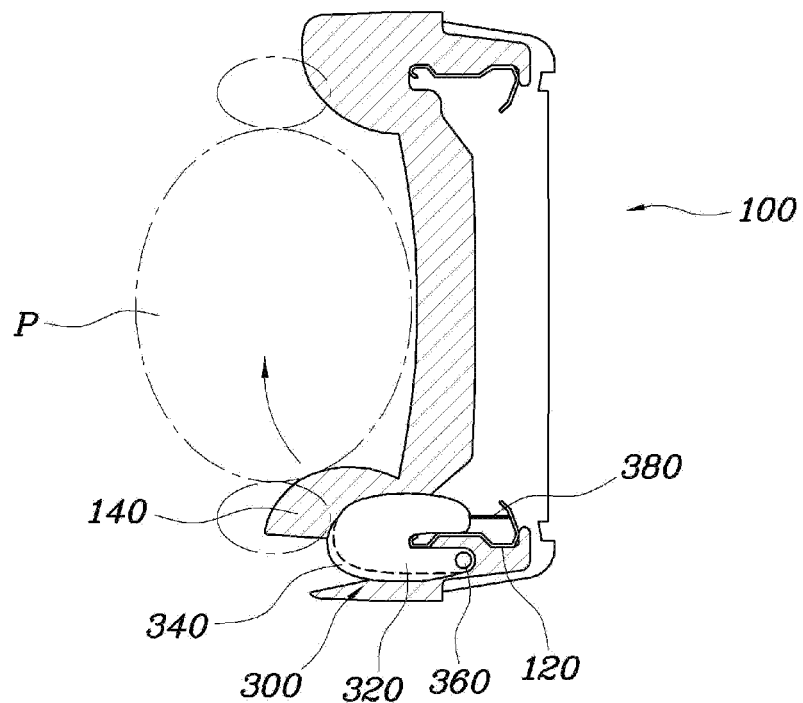
FIG. 3 is a view illustrating an initial stage of the deployment of the side airbag of FIG. 1.
Figure 4:
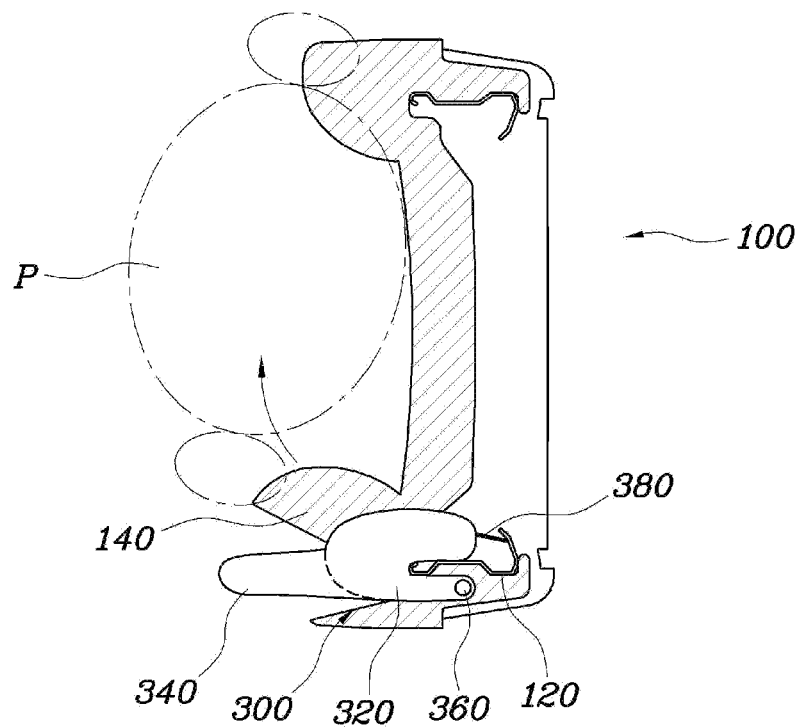
FIG. 4 is a view illustrating a middle stage of the deployment of the side airbag of FIG. 1.
Figure 5:
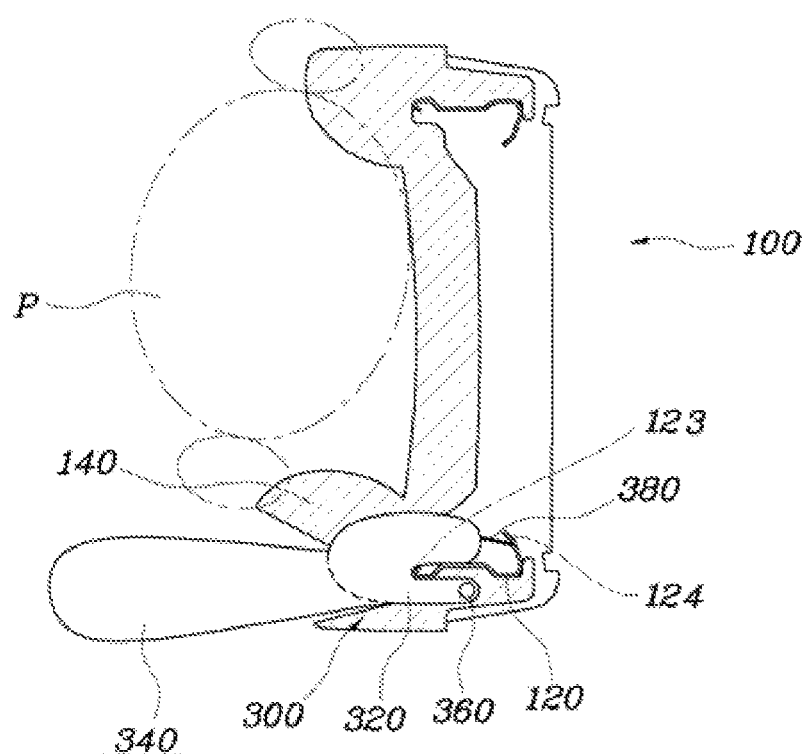
FIG. 5 is a view illustrating a last stage of the deployment of the side airbag of FIG. 1.

FIG. 2 is a view illustrating the installation of the side airbag of FIG. 1 in the seat. FIGS. 3 through 5 are views showing a progress of the deployment of the side airbag in chronological order. Hereinafter the side airbag according to the exemplary embodiment of the present invention will be described in more detail with reference to these drawings.

The side airbag according to the exemplary embodiment of the present invention includes the inflator 360, the first cushion part 320 and the second cushion part 340. The inflator 360 is installed in a seat side frame 120 of the vehicle. The first cushion part 320 is connected to the inflator 360 and covers the seat side frame 120 so that when the inflator 360 is operated, the first cushion part 320 inflates inside the seat side pad 140 to push the occupant P in a sideways direction. The second cushion part 340 is integrally connected to the first cushion part 320. Thus, when gas is supplied from the inflator 360 into the second cushion part 340 via the first cushion part 320, the second cushion part 340 inflates out of the seat side pad 140 to protect the side portion of the occupant P.

As shown in FIG. 2, a seat frame is installed in the seat 100. The seat frame generally has seat side frames 120 on both sides thereof. The seat frame may be configured in such a way that the seat side frames 120 are integrally provided on a main frame of the seat frame or that the seat side frames 120 are separately manufactured before they are assembled with the main frame. In an exemplary embodiment of the present invention, it will be understood that the term "seat side frame 120" refers to a side frame provided in the corresponding seat side pad 140 in a broad sense.

The inflator 360 is installed on the seat side frame 120. In detail, the inflator 360 is mounted to an outer side surface of the seat side frame 120. The first cushion part 320 is connected to the inflator 360 and covers the seat side frame 120. In an exemplary embodiment of the present invention, because the inflator 360 is disposed outside the seat side frame 120, the first cushion part 320 can cover the seat side frame 120. This structure makes it effective to inflate the first cushion part 320 in such a way that the volume of the portion of the first cushion part 320 that is located inside the seat side frame 120 is greater than that of the portion of the first cushion part 320 that is located outside the seat side frame 120. In other words, while the first cushion part 320 pushes the occupant P sideways, the first cushion part 320 is generally supported by a door frame and the seat side frame 120 to which the inflator 360 is mounted.

The first cushion part 320 having such a structure inflates inside the seat side pad 140. Here, after the first cushion part 320 has inflated to a predetermined degree, the second cushion part 340 tears a tear line 142 formed on the seat side pad 140 and protrudes outs of the seat side pad 140 through the tear line 142 before being deployed forwards to protect the side portion of the occupant P.

Meanwhile, the side airbag further includes a tether 380 which has a first end connected to the first cushion part 320 and a second end connected to the seat side frame 120 to support the first cushion part 320 so that the first cushion part 320 maintains covering the seat side frame 120 while it inflates.

The tether 380 functions to hold the first cushion part 320 so that even when the first cushion part 320 inflates, it can covers the seat side frame 120. Due to the tether 380, the first cushion part 320 inflates in a shape of a sausage. This structure can prevent the first cushion part 320 from excessively striking the occupant P. In addition, this structure makes it possible for the second cushion part 340 to be correctly deployed forwards. As such, due to the tether 380, the first cushion part 320 inflates to a predetermined thickness inside the seat side pad 140, thus effectively pushing the occupant P sideways.

The second cushion part 340 may be connected to a medial portion of the first cushion part 320 which covers the seat side frame 120. In this case, after the first cushion part 320 has inflated to a predetermined volume, the second cushion part 340 protrudes from the medial portion of the first cushion part 320 forwards. Alternatively, the second cushion part 340 may be connected to the first cushion part 320 at a point displaced slightly outwards from the medial portion of the first cushion part 320 which covers the seat side frame 120. In this case, because the second cushion part 340 is slightly disposed outwards from the medial portion of the first cushion part 320, there is a further increase in the distance that the second cushion part 340 is spaced apart from the occupant P when it inflates, and the second cushion part 340 can come into close contact with the door. Therefore, the occupant P can be more reliably prevented from being injured by the cushion 300.

Meanwhile, the side airbag according to another embodiment of the present invention may include a seat side frame 120, an inflator 360, a first cushion part 320 and a second cushion part 340. The seat side frame 120 is installed in the seat side pad 140. The inflator 360 is provided on the seat side frame 120. The first cushion part 320 is connected to the inflator 360 and covers the seat side frame 120 so that when the inflator 360 is operated, the first cushion part 320 inflates inside the seat side pad 140 to push the occupant P in a sideways direction. The second cushion part 340 is integrally connected to the first cushion part 320. Thus, when the inflator 360 is operated, gas is supplied into the second cushion part 340 via the first cushion part 320 so that the second cushion part 340 inflates out of the seat side pad 140 to protect the side portion of the occupant P.

In the present embodiment, particularly, both ends of the seat side frame 120 respectively have front and rear bent parts 123 and 124 which are bent toward the inside of the seat. The first cushion part 320 is configured in such a way that it covers and surrounds the front bent part 123 of the seat side frame 120.

Because the first cushion part 320 surrounds the front bent part 123 of the seat side frame 120, the first cushion part 320 can be prevented from being damaged by the end of the seat side frame 120. Furthermore, the first cushion part 320 can smoothly inflate around the front bent part 123 of the seat side frame 120.

Furthermore, the side airbag according to the present embodiment of the present invention may further include a tether 380 which has a first end connected to the first cushion part 320 and a second end connected to the seat side frame 120 to support the first cushion part 320 so that the first cushion part 320 covers the seat side frame 120 while it inflates. The inflator 360 is mounted to an outer side surface of the seat side frame 120. The first cushion part 320 is connected to the inflator 360 and surrounds the front bent part 123 of the seat side frame 120. The tether 380 may connect an end of the first cushion part 320 to the rear bent part 124 of the seat side frame 120.

In detail, because the first end of the tether 380 is coupled to the end of the first cushion part 320 and the second thereof is coupled to the rear bent part 124 of the seat side frame 120, the coupling force between the first cushion part 320 and the seat side frame 120 is enhanced. In addition, as the first cushion part 320 inflates, the end of the first cushion part 320 heads toward the rear bent part 124 of the seat side frame 120. Hence, the first cushion part 320 can effectively push the occupant P sideways away from the door. Moreover, in the case where the tether 380 is connected to the rear bent part 124 of the seat side frame 120, the airbag module that is mounted to the seat side frame 120 can be easily installed in the seat side pad 140, thus making the assembly process, the maintenance and the repair easier.

The process of the deployment of the side airbag of the present invention will be described in chronological order. As shown in FIG. 2, in normal conditions, the first cushion part 320 and the second cushion part 340 are in a state of having been embedded in the seat side pad 140 while covering the seat side frame 120. Referring to FIG. 3, in the initial stage of the deployment, the first cushion part 320 inflates inside the seat side pad 140 in a shape of a sausage. This shape can be maintained by the tether 380. The occupant P is rapidly pushed sideways away from the door by the inflation of the first cushion part 320. Thereafter, as shown in FIG. 4, with the passage of time, the first cushion part 320 further inflates so that the second cushion part 340 is exposed to the outside of the seat side pad 140 and then begins to inflate forwards. In the last stage of the deployment, as shown in FIG. 5, the second cushion part 340 completely inflates to protect the side portion of the occupant P, and the first cushion part 320 continuously supports the side portion of the occupant P.

As described above, the present invention provides a side airbag for a vehicle which can push an occupant away from a vehicle door before an airbag cushion is deployed, despite using only a single airbag module.

Furthermore, a first cushion part covers while it inflates, so that it can effectively support the occupant and push him/her away from a vehicle door. In addition, the first cushion part is supported by a tether so that the first cushion part is stably kept in position inside a seat side pad, thus effectively supporting the occupant.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side airbag for a vehicle, comprising:
an inflator provided on a seat side frame in a seat of the vehicle;
a first cushion part installed in a seat side pad mounted on the seat side frame, wherein the first cushion part while deflated wraps around a front edge of the seat side frame and is fluid-connected to the inflator, and wherein the first cushion part inflates to displace the seat side pad to push an occupant sideways through the seat side pad as the inflator inflates the first cushion part;
a second cushion part integrally and fluidly connected to the first cushion part so that when gas is supplied from the inflator into the second cushion part via the first cushion part, the second cushion part protrudes out of the seat side pad to protect a side portion of a body of the occupant; and a tether having a first end directly connected to a terminal end of the first cushion part and a second end connected to an inner side of the side seat frame adjacent the first cushion part to support the first cushion part so that the first cushion part continues to wrap around the seat side frame while the first cushion part inflates.

2. The side airbag as set forth in claim 1, wherein
the inflator is mounted to an outer side surface of the seat side frame;
the first cushion part is connected to the inflator to cover the seat side frame along the outer side surface of the front end of the seat side frame; and
the tether is disposed to connect the distal end of the first cushion part to the seat side frame along an inner side surface of the seat side frame.

3. The side airbag as set forth in claim 1, wherein a tear line is formed in the seat side pad along a front lower side from a rear inner portion of the seat side pad and the second cushion part tears the tear line and protrudes out of the seat side pad through the tear line before being deployed forwards to protect the side portion of the occupant.

4. The side airbag as set forth in claim 1, wherein the first cushion part has a height corresponding to a range from a waist to a chest of the occupant.

5. The side airbag as set forth in claim 1, wherein the second cushion part is connected to a medial portion of the first cushion part that covers the seat side frame.

6. The side airbag as set forth in claim 1, wherein the second cushion part is connected to the first cushion part at a predetermined point displaced outwards from a medial portion of the first cushion part that covers the seat side frame.

7. A side airbag for a vehicle, comprising:
a seat side frame provided in a seat side pad in a seat of the vehicle;
an inflator provided on the seat side frame;
a first cushion part installed in the seat side pad to cover the seat side frame, wherein the first cushion part is fluid-connected to the inflator, and wherein the first cushion part while deflated wraps around a front edge of the seat side frame, and wherein the first cushion part inflates to displace the seat side pad to push an occupant sideways through the seat side pad as the inflator inflates the first cushion part;

a second cushion part integrally formed with and fluidly-connected to the first cushion part so that when gas is supplied from the inflator into the second cushion part via the first cushion part, the second cushion part inflates out of the seat side pad to protect a side portion of a body of the occupant; and a tether having a first end directly connected to a terminal end of the first cushion part and a second end connected to an inner side seat frame adjacent the first cushion part to support the first cushion part so that the first cushion part continues to wrap around the seat side frame while the first cushion part inflates.

8. The side airbag as set forth in claim 7, wherein the seat side frame includes front and rear bent parts formed by bending both ends of the seat side frame toward an inside of the seat.

9. The side airbag as set forth in claim 8, wherein the first cushion part covers and surrounds the front bent part of the seat side frame.

10. The side airbag as set forth in claim 7, wherein
the inflator is mounted to an outer side surface of the seat side frame;
the first cushion part is connected to the inflator along the outer side surface of the front end of the seat side frame to cover the front bent part of the seat side frame; and
the tether is disposed to connect the distal end of the first cushion part to the rear bent part of the seat side frame to cover the front bent part of the seat side frame.

11. The side airbag as set forth in claim 7, wherein a tear line is formed in the seat side pad along a front lower side from a rear inner portion of the seat side pad and the second cushion part tears the tear line and protrudes out of the seat side pad through the tear line before being deployed forwards to protect the side portion of the occupant.

\* \* \* \* \*